(12) United States Patent
Ma et al.

(10) Patent No.: US 8,354,614 B2
(45) Date of Patent: Jan. 15, 2013

(54) METHOD TO MONITOR THE LIFE OF THE CONTACT TIP IN ROBOTIC OR AUTOMATIC GMAW

(75) Inventors: Tiejun Ma, Tecumseh (CA); Thomas Jaeger, Tilbury (CA)

(73) Assignee: Illinois Tool Works Inc., Glenview, IL (US)

( * ) Notice: Subject to any disclaimer, the term of this patent is extended or adjusted under 35 U.S.C. 154(b) by 251 days.

(21) Appl. No.: 12/836,027

(22) Filed: Jul. 14, 2010

(65) Prior Publication Data

US 2011/0073580 A1 Mar. 31, 2011

Related U.S. Application Data

(60) Provisional application No. 61/245,823, filed on Sep. 25, 2009.

(51) Int. Cl.
*B23K 9/095* (2006.01)

(52) U.S. Cl. .................................. 219/137 R

(58) Field of Classification Search ............. 219/130.01, 219/137.2, 74, 86.1, 131.31, 137 R, 78.01, 219/118, 145.22, 121.63–121.64, 136, 75, 219/145.31, 137.31, 145.1, 86.51, 86.7, 86.41, 219/91.1, 110, 54

See application file for complete search history.

(56) References Cited

U.S. PATENT DOCUMENTS

| | | | |
|---|---|---|---|
| 4,504,728 A | 3/1985 | Ukai et al. | |
| 4,973,813 A | 11/1990 | Mitchell | |
| 5,221,825 A | 6/1993 | Siewert et al. | |
| 5,486,679 A | 1/1996 | Hamura et al. | |
| 5,812,408 A | 9/1998 | Karakama et al. | |
| 6,710,300 B2 | 3/2004 | Steenis et al. | |
| 6,943,318 B2 | 9/2005 | Takagi et al. | |
| 2008/0035623 A1 | 2/2008 | Hutchison | |
| 2008/0314876 A1 | 12/2008 | Pinsonneault et al. | |

FOREIGN PATENT DOCUMENTS

| | | | |
|---|---|---|---|
| DD | 259162 | | 8/1988 |
| EP | 1283088 | | 2/2003 |
| JP | 8318372 | * | 12/1996 |
| JP | 2000-024779 | * | 1/2000 |
| JP | 2000024779 | | 1/2000 |
| JP | EP 1283088 | * | 9/2002 |

(Continued)

OTHER PUBLICATIONS

Holm, R., "Electrical contacts, Theory and applications," pp. 40, 41, 86, 87, 160, 161, 274, 275, 304, 305, 4th ed., Springer, 2000.
Thier, H. et al., "Current contact tip life—Evaluation for different contact tip materials and shapes," Welding and Cutting, pp. 22-27, vol. 46, No. 5, 1995.

(Continued)

*Primary Examiner* — Dao H Nguyen
*Assistant Examiner* — Tram H Nguyen
(74) *Attorney, Agent, or Firm* — Fildes & Outland, P.C.

(57) ABSTRACT

A method of monitoring contact tip useful life in a welding torch includes measuring at least one of welding current (I) and welding voltage (V) of the contact tip mounted in the welding torch. Deterioration of the contact tip is quantified based on one or both of (i) a decrease of the welding current and increase of a standard deviation of the welding current (sd_I), and (ii) an increase of the welding voltage. Deterioration of the contact tip may be quantified by calculating an index of contact tip life (ITL) based on the welding current and standard deviation of the welding current and/or by calculating a reference index of contact tip life (ITL_v) based on the welding voltage.

12 Claims, 8 Drawing Sheets

FOREIGN PATENT DOCUMENTS

| | | | |
|---|---|---|---|
| JP | EP 1283088 | * | 2/2003 |
| WO | 2009/031704 | | 3/2009 |
| WO | WO 2009031704 | * | 3/2009 |
| WO | WO2009031704 | * | 12/2009 |

OTHER PUBLICATIONS

Shimizu, H. et al, "Wear mechanism in contact tube," Science and Technology of Welding and Joining, pp. 94-105, vol. 11, No. 1, 2006.

* cited by examiner

METHOD TO MONITOR THE LIFE OF THE CONTACT TIP IN ROBOTIC OR AUTOMATIC GMAW

CROSS REFERENCE TO RELATED APPLICATION

This application claims the priority of U.S. Provisional Application No. 61/245,823 filed Sep. 25, 2009.

TECHNICAL FIELD

This invention relates to contact tips for a welding torch, and more particularly to a method of monitoring performance of a contact tip in non-constant voltage GMAW (gas metal arc welding) applications.

BACKGROUND OF THE INVENTION

It is known in the art relating to robotic and automatic GMAW manufacturing applications that the welding torch contact tip, being a consumable item, is usually replaced between shifts, during maintenance, or when an operator observes unacceptable welding defects on manufacturing workpieces. If the contact tip needs to be replaced during a shift, the entire welding line or cell must be shut down, which results in manufacturing delays and increased costs for the plant.

Judging when to replace a contact tip is a subjective process. Certain operators may pass (accept) some workpieces having welding defects, while other operators may have less tolerance for defects, thereby consuming more contact tips over time. Also, usually when an operator determines that a contact tip needs to be replaced, welding defects have begun to occur, thus meaning that some workpieces may have to be repaired or scraped for quality reasons.

Historically, there have been two major contact tip failure mechanisms that have been observed over the past 50 years in constant voltage (CV) welding applications. The first is excessive wear at the front of the bore in the contact tip, which is known as a "keyhole." The second failure mechanism is a sudden stoppage of the feeding of electrode welding wire due to a clog and/or excessive feeding force, causing the electrical welding arc to burn back to the contact tip, which is known as "burn back."

The application of new GMAW welding processes, especially pulse and modified short circuit welding, over the past decade has introduced a new contact tip failure mechanism. The high frequency and high peak current of pulse and modified short circuit welding make that working conditions of the contact tip more critical than in CV welding. In pulse and short circuit welding, the function of the contact tip becomes a "sliding switch," i.e., while the electrode welding wire slides along the central bore of the contact tip, energy is transferred at dramatically changing (variable) rates. For example, it is common for a 0.9 mm (0.035 inch) solid electrode wire to be welded at 400 Amp peak current in a pulse welding application, while in constant voltage applications the typical welding current is only about 200 to 250 Amps. Also, in pulse welding, the welding current changes from the background current (100 Amps) to the peak current (400 Amps) in 0.15 ms, which corresponds to a rate of 2,000,000 Amps per second. The high welding current and drastic current ramp causes significant arc erosion on the contact tip, thus deteriorating the contact tip. Pulse welding applications are also typically set at high welding speeds, and therefore require accurate delivery of the welding current waveforms to the arc. Thus, consistent performance of the contact tip is more critical than in CV applications. Also, the useful lifespan of a contact tip in pulse applications is significantly shorter than in CV applications. Therefore, it is more likely that the contact tip will have to be replaced during a shift, and knowing when to replace the contact tip is important for preventing welding defects and minimizing operating costs.

Conventional control systems in robotic and automatic welding applications compare the commanded (desired) welding current and voltage with actual measured data. When the difference between the commanded values and the measured data is higher than a certain predetermined threshold, the system will regard the welding as out of compliance and will request immediate action such as shut down of the manufacturing line. However, a monitoring method does not exist that outputs an alarm or other signal prior to the occurrence of welding defects. Thus, there is a need for monitoring contact tip deterioration in real time so that contact tips may be replaced prior to the occurrence of welding defects or at least in a manageable manner such that welding defects and contact tip replacement are kept at a minimum.

SUMMARY OF THE INVENTION

The present invention provides a method for monitoring the useful life of a contact tip in robotic or automatic manufacturing processes that use non-CV GMAW applications such as pulse, modified pulse, modified short circuit, or similar. In non-CV waveforms, the welding current periodically varies between certain values, including but not limited to the peak and background currents. The present method utilizes decrease of the welding current (I), increase of the standard deviation of the welding current (sd_I), and increase of welding voltage (V) to characterize the deterioration of the contact tip numerically as an index of contact tip life (ITL, ITL_v). The ITL and/or ITL_v provides real-time monitoring of contact tip wear, allowing operators to be proactive rather than reactive in replacing deteriorated (spent) contact tips.

More particularly, a method of monitoring contact tip useful life in a welding torch in accordance with the present invention includes measuring at least one of welding current (I) and welding voltage (V) of the contact tip mounted in the welding torch. The deterioration of the contact tip is quantified based on one or both of (i) a decrease of the welding current and increase of a standard deviation of the welding current (sd_I), and (ii) an increase of the welding voltage.

The method may further include averaging the welding current and welding voltage measured over a period of time to obtain a single welding current value and a single welding voltage value for the period of time. The period of time may correspond to one weld with one arc start and one arc end. The measurements may be taken while performing a chosen representative weld on a workpiece. The method may also include removing the noise and known error from the measured welding current and welding voltage during at least one of an arc start and an arc stop (crater).

The method may further include obtaining starting parameters including an initial welding current ($I_0$) and a standard deviation of the welding current ($sd\_I_0$) over an initial period of time. Deterioration of the contact tip may be quantified by calculating an index of contact tip life (ITL) from the following Equation 1 which is a function of the welding current and the standard deviation of the welding current:

$$ITL = \left| \frac{I - a \cdot I_0}{2 \cdot (1-a) \cdot I_0} \right| + \left| b - \frac{sd\_I}{sd\_I_0} \right| \quad \text{(Eq. 1)}$$

wherein a is a constant factor of current decay and b is a constant factor of the sd_I increase. The calculated ITL may be sent to one of a human operator and an automated controller. An ITL value less than or equal to a threshold value may indicate that the contact tip is reaching the end of its useful life. The threshold value, for example, may be a value of 0.30, but may be any value between 0 and 0.30. When the ITL reaches the threshold value, one or more of the following may be performed: sounding an alarm, displaying a warning message, scheduling a contact tip change, and triggering an automatic contact tip change. At least one of the constant factors a and b may be adjusted if welding quality is acceptable when the ITL reaches a threshold value or if welding quality is unacceptable before the ITL reaches the threshold value. An average of a plurality of calculated ITL values may be sent to the human operator or the automated controller. The values for the initial welding current ($I_0$) and the standard deviation of the welding current ($sd\_I_0$) may be obtained by one of experimentation and theoretical calculation. Equation 1 is an example formula of ITL calculation. Any similar formula that uses welding current and fluctuation of welding current to draw a numerical index of the contact tip performance (or deterioration) is within the scope of the invention. For example, an index of contact tip life (ITL) may be calculated as a function of at least one of the welding current (I) and the standard deviation of the welding current (sd_I), and the ITL decreases from full scale towards 0 as the welding current decreases and/or the standard deviation of the welding current increases in certain ranges.

The method may further include obtaining starting parameters including an initial welding voltage ($V_0$). Deterioration of the contact tip may be quantified by calculating a reference index of contact tip life (ITL_v) from the following Equation 2 which is a function of the welding voltage:

$$ITL\_v = 1 + \frac{V_0 - V}{c \cdot V_0} \quad \text{(Eq. 2)}$$

wherein c is a constant factor of welding voltage increase. The calculated ITL_v may be sent to one of a human operator and an automated controller. An ITL_v value less than or equal to a threshold value may indicate that the contact tip is reaching the end of its useful life. The threshold value, for example, may be a value of 0.30, but may be any value between 0 and 0.30. When the ITL_v reaches the threshold value, one or more of the following may be performed: sounding an alarm, displaying a warning message, scheduling a contact tip change, and triggering an automatic contact tip change. The constant factor c may be adjusted if welding quality is acceptable when the ITL_v reaches a threshold value or if welding quality is unacceptable before the ITL_v reaches the threshold value. An average of a plurality of calculated ITL_v values may be sent to the human operator or the automated controller. The initial welding voltage ($V_0$) may be obtained by one of experimentation and theoretical calculation. Alternatively, a reference index of contact tip life (ITL_v) may be calculated as a function of the welding voltage (V), and the ITL_v decreases from full scale towards 0 when the welding voltage increases for a certain range.

These and other features and advantages of the invention will be more fully understood from the following detailed description of the invention taken together with the accompanying drawings.

DETAILED DESCRIPTION OF THE INVENTION

Figure 1:
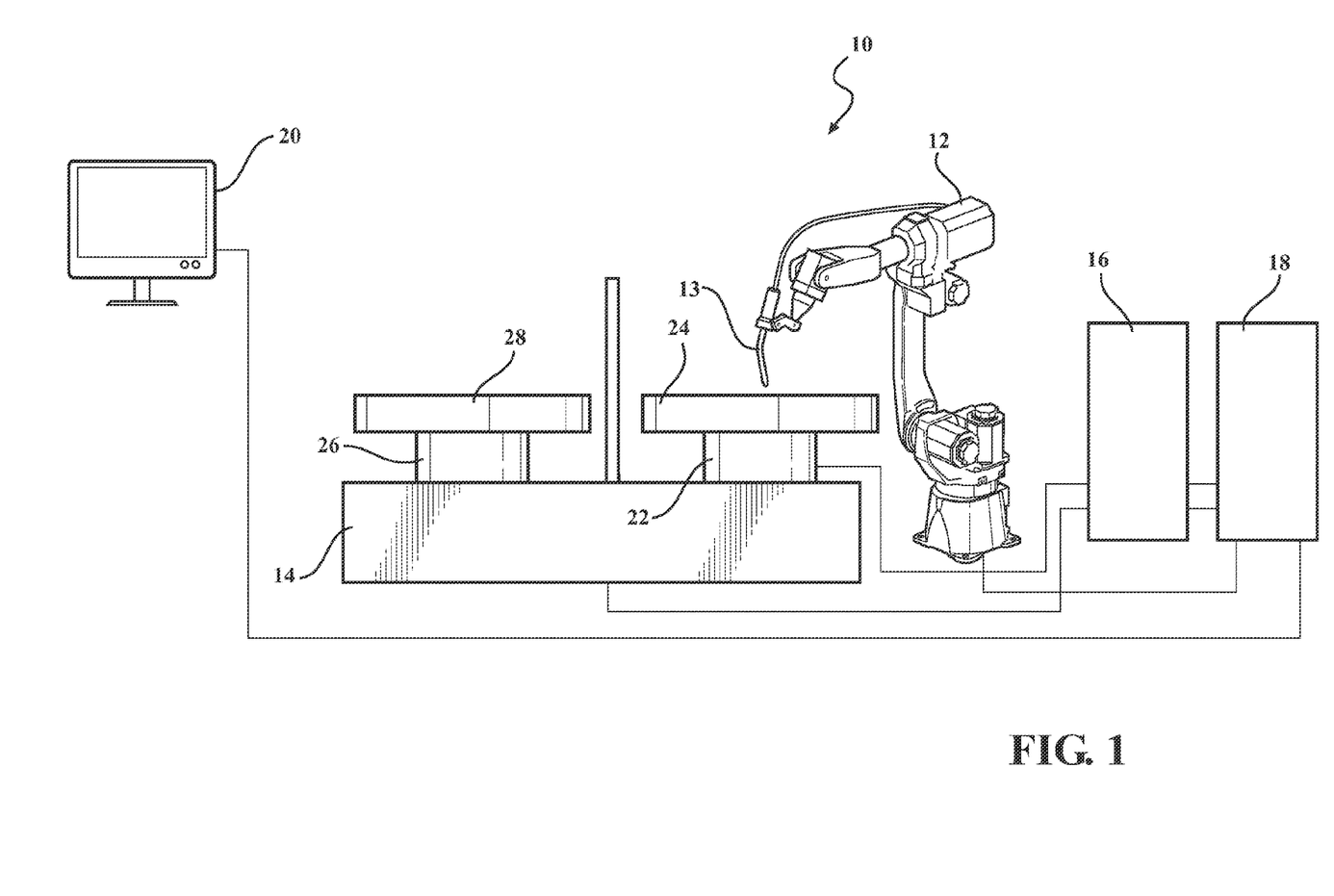
FIG. 1 is a schematic view of a robotic welding manufacturing cell.

Referring now to the drawings in detail, numeral 10 in FIG. 1 generally indicates a robotic welding manufacturing cell. The welding cell 10 generally includes a welding robot 12 including a welding torch 13, a turn table 14 disposed in a working relationship relative to the robot, a power source 16 connected to the robot, a robot controller 18 connected to the power source, the robot, and the turn table, and a manufacture line display and control (MLDC) 20. The turn table 14 may have two sides including an A-side 22 that holds a workpiece such as part 24 and a B-side 26 that holds a workpiece such as part 28. While part 24 is being welded by the robot 12, part 28 may be loaded/unloaded by a handling robot or a human operator.

The welding power source 16 and the robot controller 18 may be separate or may be integrated in one unit. In either case, the power source 16 and controller 18 provide proper welding energy and control the welding locations and sequences. The MLDC 20 monitors and controls the welding performed in the cell 10, which includes managing the welding programs of the robot, part movement, fixture engagement, and safety, and displaying information indicating the status of the cell. The MLDC 20 may also coordinate an entire manufacturing line having more than one welding cell.

Most of the power sources currently used in automatic welding manufacturing lines are digital power sources having integrated data recording systems that allow for real-time acquisition of welding parameters including welding current, welding voltage, wire feeding speed, and the like. In the present invention, welding current and voltage are acquired and processed by the power source 16, or the robot controller 18, or an independent device such as the MLDC 20, so that digital values can be calculated and then displayed on the MLDC.

The welding torch 13 is equipped with a contact tip through which consumable electrode wire is fed during while the robot 12 welds workpieces. The contact tip itself is a consumable item and must be replaced periodically to maintain acceptable welding quality. Knowing when to replace the contact tip is important for preventing welding defects while also minimizing operating costs. The present invention provides a method for monitoring the useful life of the welding torch contact tip in the welding work cell 10.

Figure 2:
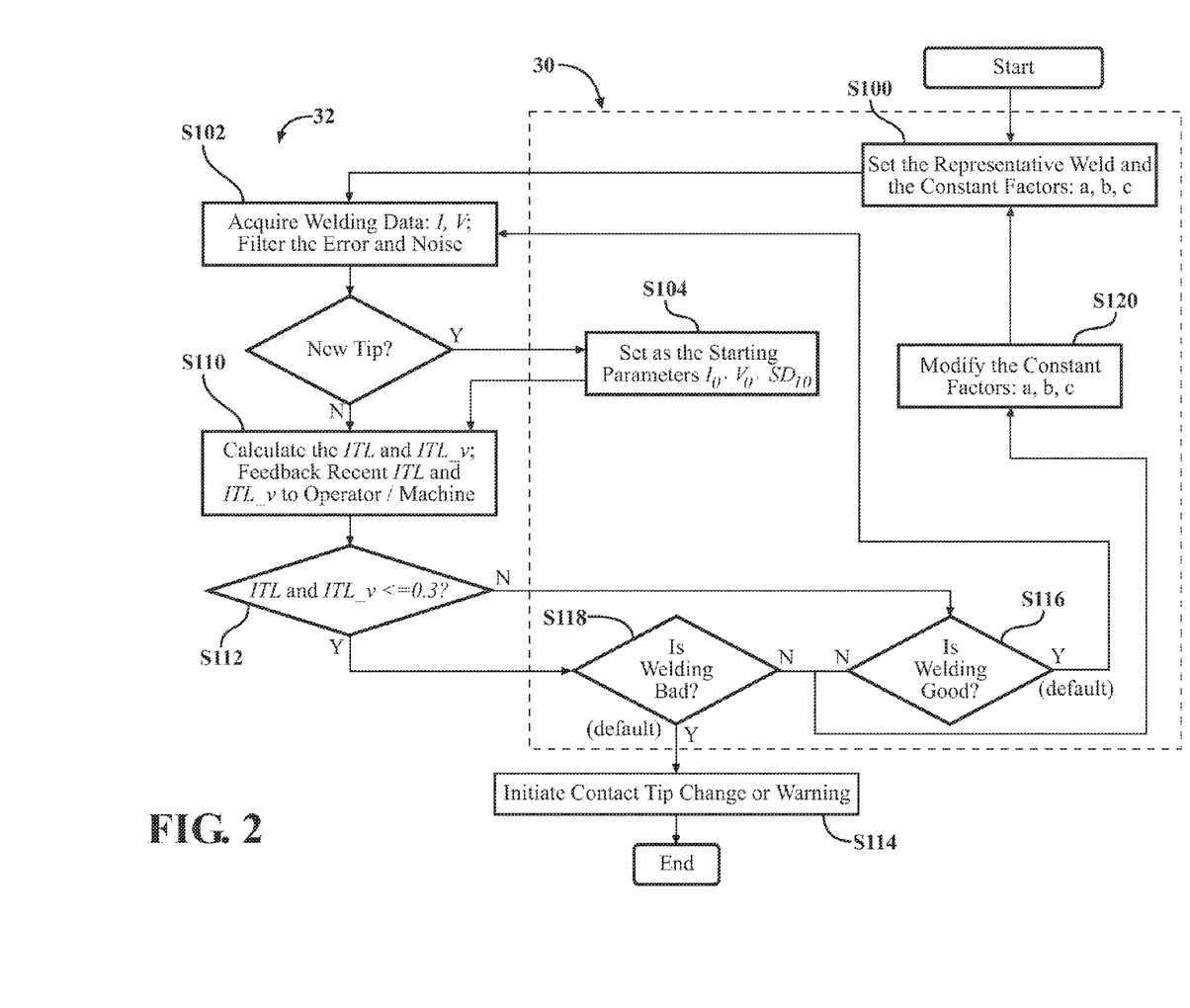
FIG. 2 is a flow chart including steps of a method of monitoring contact tip useful life in a welding torch in accordance with the present invention.

FIG. 2 is a flow chart of a method for monitoring the contact tip useful life in accordance with the present invention. The method generally includes two portions: a manual setup process 30 and an automated output process 32. The setup process 30 is performed by a welding engineer or other human operator to manually determine and set certain parameters utilized in the output process 32. The steps of the setup process are typically performed when the welding cell 10 is offline. The output process 32 is performed automatically by the welding cell controller 20 or other computer device and calculates values which quantitatively indicate a degree of contact tip performance, and the steps of the output process 32 are typically performed when the welding cell 10 is online.

Step S100 at the beginning of the method is to set a representative weld and initial threshold factors. This step is part of the setup process 30 performed manually such as when setting up the welding cell 10. For each welding cycle, one representative weld is chosen as the source of welding data. The conditions for each representative weld should be as close to the same as possible. These conditions include but are not limited to the welding parameters, the location of the weld, and the fixture set (if there is more than one set of fixtures). If the robot 12 welds on only one type of fixture in the cell 10, then the most stable weld (which is usually the longest weld on the workpiece) should be chosen as the representative weld. If the robot 12 welds more than one fixture type such as shown in FIG. 1 (turntable A-side 22 and B-side 26), then only one of the fixtures is considered in choosing the representative weld. This eliminates any variance that may occur between various fixtures, although comparing data from different fixtures may be useful for verifying the settings of the fixtures such as alignment and grounding. Further, the reason for choosing a representative weld is that different welds on the same workpiece may have different welding parameters, different joint types, part thickness, or slightly different contact tip to work distances (CTWD) which results in different welding currents when forming each of the welds. For example, a typical high speed pulse weld on 1.14 mm (0.045") solid wire at 240 Amps of welding current and a CTWD of 16 mm (0.63") may exhibit a 4 to 8 Amp change in welding current if the CTWD is varied by one millimeter (1 mm), which affects the calculations described below.

The constant factors (a, b, c) may initially be set at standard values that are either determined theoretically or based upon historical data for the same or similar work cell 10. The constant factors may be modified and fine-tuned later based on the performance of contact tips in the work cell.

After setting the initial constant factors and the representative weld, welding parameters including welding current, standard deviation of the welding current, and welding voltage are acquired at step S102. The welding current and welding voltage data may be obtained experimentally from the power source 16 or from independent sensors. The data acquisition frequency preferably is no less than approximately 1000 queries per second. The acquired data then may be filtered to remove errors and known noise. For example, welding power sources typically use different wave forms at the arc start and the arc end. It is preferable to eliminate the data from approximately the first second (arc start) and the last half second (arc end) of welding as the arc and the welding pool are not stable at these times.

The system can automatically obtain the initial welding parameters ($I_0$, $V_0$, $sd\_I_0$) from the average of the first several minutes of arc-on time (or several workpieces) when a new contact tip is installed. Alternatively, a welding engineer or other human operator can collect the data by performing a welding test using a new contact tip, and input into the system. Note that the value of the $sd\_I$ is influenced by the data acquisition frequency and the length of the weld. An adequate amount of data for calculating the standard deviation of the welding current is at least 30 data points, and preferably is 50 data points or more. For example, the length of the representative weld may be 180 mm (7 inches), the welding travel speed may be 0.9 m/min (35 inches per minute), the time to finish the representative weld may therefore be 180/(0.9*1000) minutes which is equal to 0.2 minutes (12 seconds), the data acquisition frequency at the welding power source may be 1000 queries per second so that there are a total of 12,000 data points for the representative weld, the data from the first and last second of the weld may be removed leaving 10,000 data points, the data points may be grouped and average values are calculated for each group (e.g., each 200 consecutive data points are averaged together, leaving a total of 50 data points for the representative weld), the I is calculated as the average of the 50 welding current values of the 50 data points, the V is calculated as the average of the 50 welding voltage values of the 50 data points, and the $sd\_I$ is calculated as the standard deviation of the 50 welding current values of the 50 data points.

Alternatively the initial welding current, initial welding voltage, and the initial standard deviation of the welding current may be theoretically calculated based on factors such as welding wire size, wire feeding speed, the welding pulse waveform, the CTWD, and the like. In this case, step S104 involves manual inputting of the parameters.

Once values for the initial parameters are obtained and set, these values may be saved and reused as long as the same contact tip is used, or the representative weld continues to be a fair representation of the welding being performed in the welding cell, for example, while the robot performs welds on the same types of workpieces. It may not be necessary to recalculate the initial parameters each time a new contact tip is inserted into the welding torch. Thus, step S104 does not always need to be performed, and step S110 may merely involve accessing the initial parameters from memory.

Next, at step S110, an index of contact tip life ITL and/or a reference index of contact tip life ITL_v are calculated. The concept is, when a contact tip deteriorates, the welding current decreases, the standard deviation of the welding current increases, and the welding voltage increases. These correspondences are numerically demonstrated by two indexes: ITL and ITL_v. There are many mathematic ways to present this concept. As an example, Equation 1 gives a simple linear combination of the function of the welding current and the function of the standard deviation of the welding current:

$$ITL = \left| \frac{I - a \cdot I_0}{2 \cdot (1-a) \cdot I_0} \right| + \left| b - \frac{sd\_I}{sd\_I_0} \right| \quad \text{(Eq. 1)}$$

wherein I is the average value of the welding current for the set of real-time data, $I_0$ is the initial value of the welding current, sd_I is the calculated value of the standard deviation of the welding current for the set of real-time data, sd_$I_0$ is the initial value of the standard deviation of the welding current, a is the constant factor of the current decay (a representative value of a is 0.89), b is the constant factor of the sd_I increase (a representative value of is 1.5). Assuming a is equal to 0.89 and b is equal to 1.5, it can be seen that the ITL varies from 1 to 0 as the welding current decreases to 89% of the initial starting welding current and the standard deviation of the welding current increases by 50%.

The ITL_v decreases as the welding voltage increases from its initial value and may be calculated from the following equation ("Eq. 2"):

$$ITL\_v = 1 + \frac{V_0 - V}{c \cdot V_0} \quad \text{(Eq. 2)}$$

wherein V is the average value of the welding voltage for the set of real-time data, $V_0$ is the initial value of the welding voltage, and c is the constant factor of the welding voltage increase (a representative value of c is 0.15). For a current controlled pulse peak welding waveform mechanism, a noticeable change of welding voltage across the contact tip life will be observed. However, for a voltage controlled pulse peak welding waveform mechanism, the variance in welding voltage across the contact tip life is not very significant. Thus, the ITL_v may not yield useful results for welding applications utilizing voltage controlled pulse peak mechanisms. In this case, the ITL_v is for reference only.

The constant factors a, b, and c may change according to the welding setup, and can be manually inputted into the system. After calculating the ITL and/or the ITL_v, the calculated values are fed back to either or both of the human operator of the work cell 10 or the MLDC 20 at step S110. When the MLDC 20 receives the values of ITL and ITL_v, it may display those values visually for analysis by the human operator. The MLDC 20 may display one set of ITL and ITL_v data, or the MLDC may display the average of several consecutive values of ITL and ITL_v, so that a stable index of the contact tip life is presented.

The MLDC 20 may also display a history of the ITL and/or the ITL_v, which can aide an operator in judging whether a sudden low value for either of the indices may be caused by factors such as misalignment of the fixture or out-of-spec dimensions of a workpiece rather than excessive contact tip deterioration.

At step S112, the system compares the ITL and ITL_v values to a predetermined threshold value to determine if action is necessary. For example, if the ITL and/or the ITL_v falls below 0.30 (i.e., to 30% of the useful life of contact tip), the system may initiate a contact tip change in a manageable manner at step S114. The system may order the robot controller 18 to move the welding torch 13 to approach maintenance equipment for an automatic contact tip change procedure. Alternatively, the system may trigger a warning for manual contact tip change.

By calculating and monitoring the value(s) of the index of contact tip life ITL and the reference index of contact tip life ITL_v, the method according to the present invention avoids unexpected shutdown of a manufacturing line due to sudden failure of a contact tip and/or unacceptable welds on workpieces.

Between step S112 and step S114, the system has two default judgments, S116 and S118, which can be overridden by manual input. At step 116, the system by default assumes that the welding performance is good when the ITL and ITL_v are higher than 0.30 (i.e., the threshold value). So, the system loops to next cycle. Also, the system by default assumes at step 118 that the welding performance is bad or approaching unacceptable when the ITL and ITL_v are lower than 0.30 (i.e., the threshold value). However, if either of the above default judgments is not true, the welding engineering can interrupt the system flow and adjust the constant factors a, b, and c at step S120.

At step S116, if the welding quality is unacceptable before the ITL and/or ITL_v has reached the predetermined threshold value (e.g., 0.30), the welding engineer can either increase a and/or decrease b or c at step S120. At step S118, if the welding quality is still good after the ITL and/or ITL_v has reached the threshold value (e.g., 0.30), the welding engineer can either decrease a and/or increase b or c at step S120.

While the present invention has been described in relation to a robotic welding application, it should be understood that the present invention may also be applied to manual welding applications.

The following example of the presently claimed method illustrates the relationship between contact tip deterioration and ITL/ITL_v. A typical high speed pulse welding application was arranged in a test lab environment with the welding parameters found in the following Table 1.

TABLE 1

| Parameter | Value |
| --- | --- |
| Waveform | Lincoln Rapid Arc |
| Torch | Tregaskiss M5408-22QC |
| Wire | NS101Cu, 1.14 mm, 454 kg |
| Trim | 0.97 |
| WFS | 8.9 m/min (350 IPM) |
| CTWD | 15 mm |
| Gas | 92/8 @ 17 L/min (25 CFH) |
| Weld Speed | 1.14 m/min (45 IPM) |
| Time, Duty | 6 runs @ 20 min/run |
| Ambient Conditions | 21 ± 2° C., 30 ± 10% RH |

During the runs, the welding current and welding voltage were measured and collected at 1000 data per second, and averaged to 5 data per second. The welding current, the standard deviation of the welding current, and the welding voltage were calculated from the data of every 200 seconds. The following Table 2 includes the starting parameters and initial constant factors obtained and used for calculating the ITL and ITL_v.

TABLE 2

| Parameter | Value |
| --- | --- |
| $I_0$ | 240 Amp |
| sd_$I_0$ | 6.4 Amp |
| $V_0$ | 19.5 Volts |
| a | 0.89 |
| b | 1.5 |
| c | 0.25 |

Figure 3:
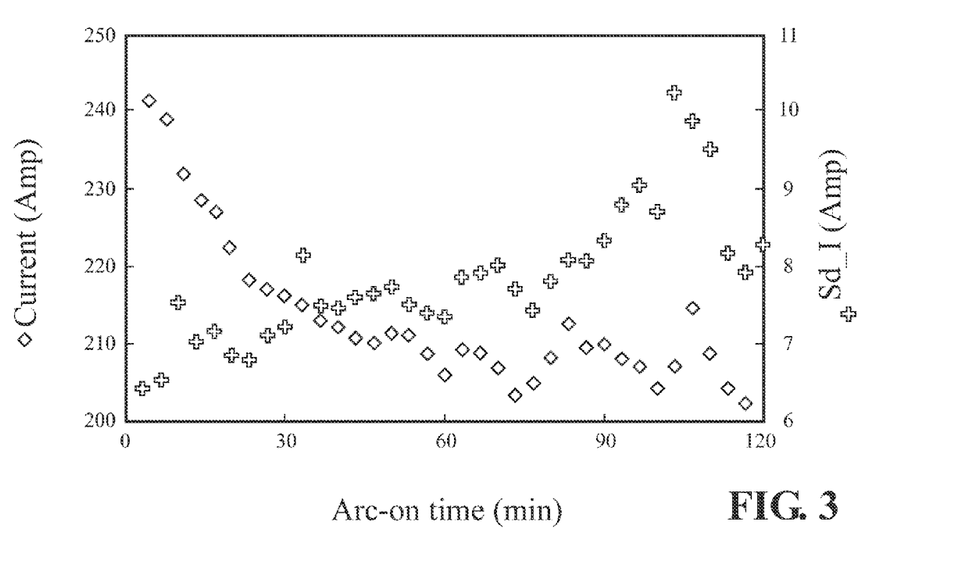
FIG. 3 is a graph of measured welding current and standard deviation of the measured welding current with respect to arc-on time.
Figure 4:
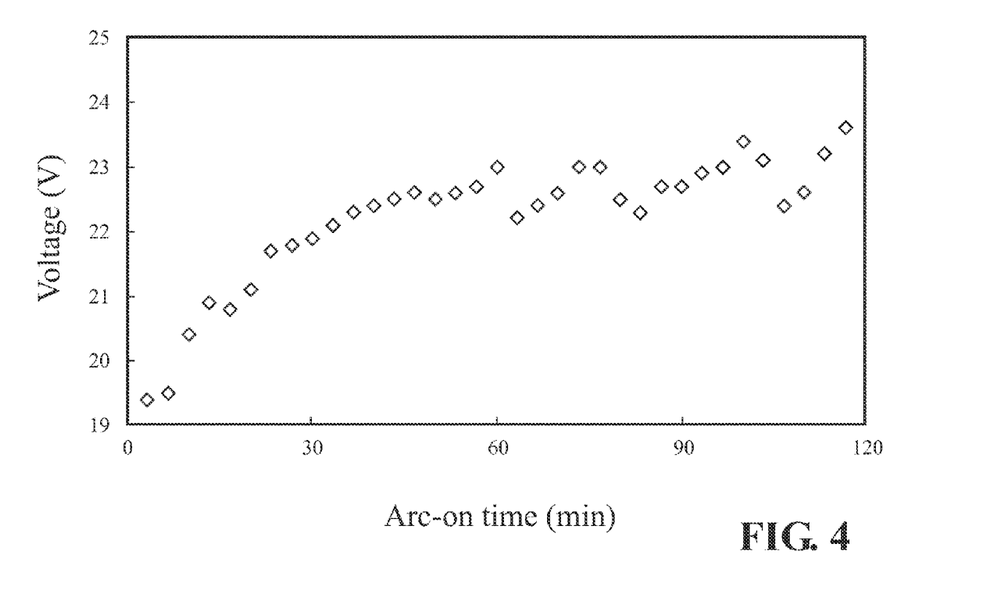
FIG. 4 is a graph of measured welding voltage with respect to arc-on time.
Figure 5:
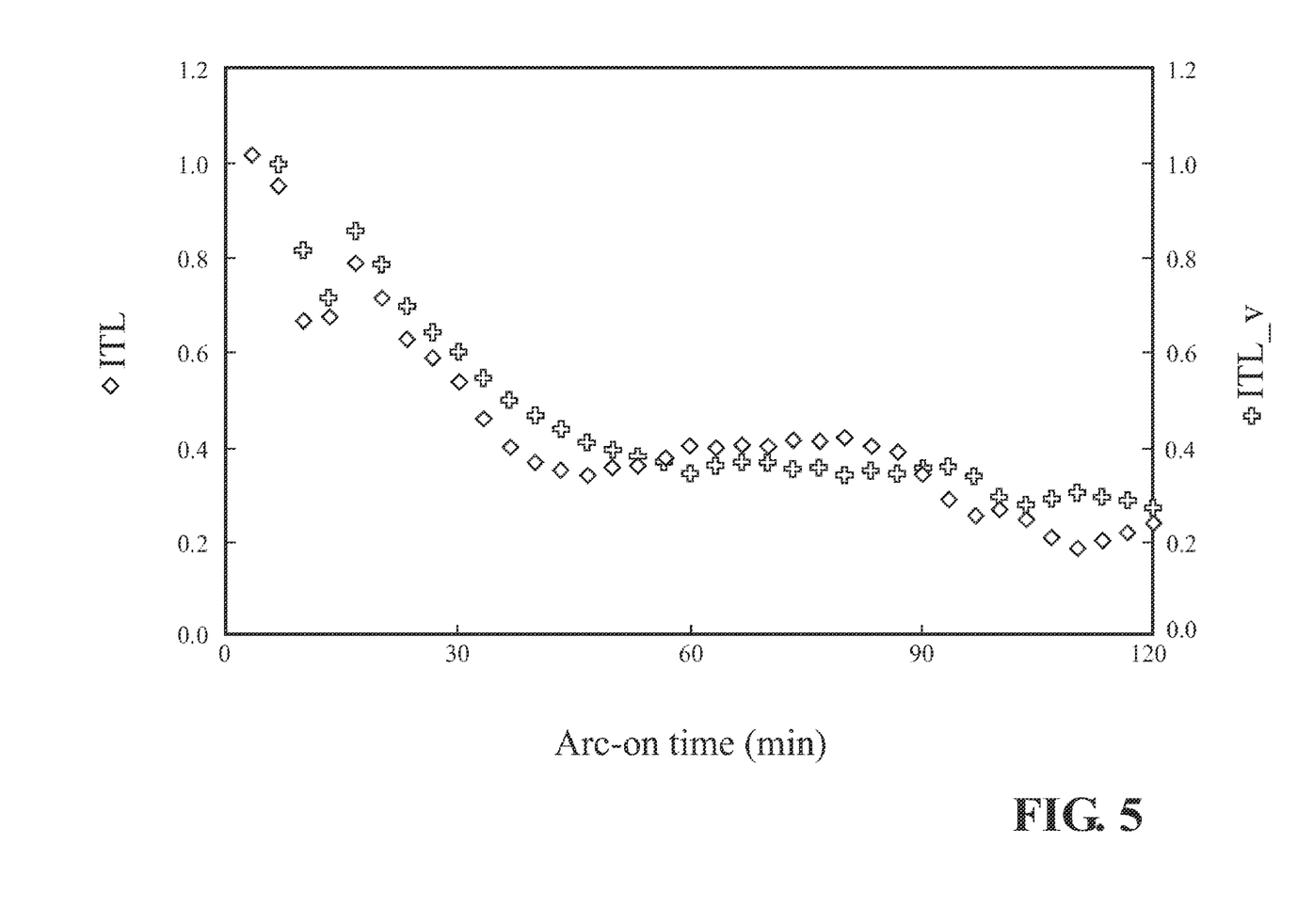
FIG. 5 is a graph of a calculated index of contact tip life ITL and a calculated reference index of contact tip life ITL_v with respect to arc-on time calculated using the data in FIGS. 3 and 4.

FIGS. 3 and 4 are graphs of the measured and calculated welding current I, standard deviation of the welding current sd_I, and welding voltage V as a function of arc-on time. FIG. 5 is a graph of the calculated ITL and ITL_v wherein every set of five values were averaged into one value to reduce scattering of the values, i.e., the first four points at the left of the graph are original ITL/ITL_v values, the fifth point is the average of the first through fifth values, the sixth point is the average of the second through sixth values, etc. Clearly the ITL and ITL_v both exhibit a similar decreasing trend as arc-on time increases. After the six runs totaling an arc-on time of 120 minutes, the standard commercial contact tip used in the welding torch was found to have substantially failed (over 20% of the welding beads were visually identified as "skinny" or "cold weld."

The reason for calculating both the ITL and ITL_v is that different welding power sources used different pulse waveform control mechanisms. Some power sources use constant current at the peak of the pulse, while other power sources may use constant voltage at the peak of the pulse. These different mechanisms affect the change of either the welding current or the welding voltage as the contact tip deteriorates. Jointly considering both the ITL and ITL_v assures a reliable index of the useful life of the contact tip in any situation.

Figure 6:
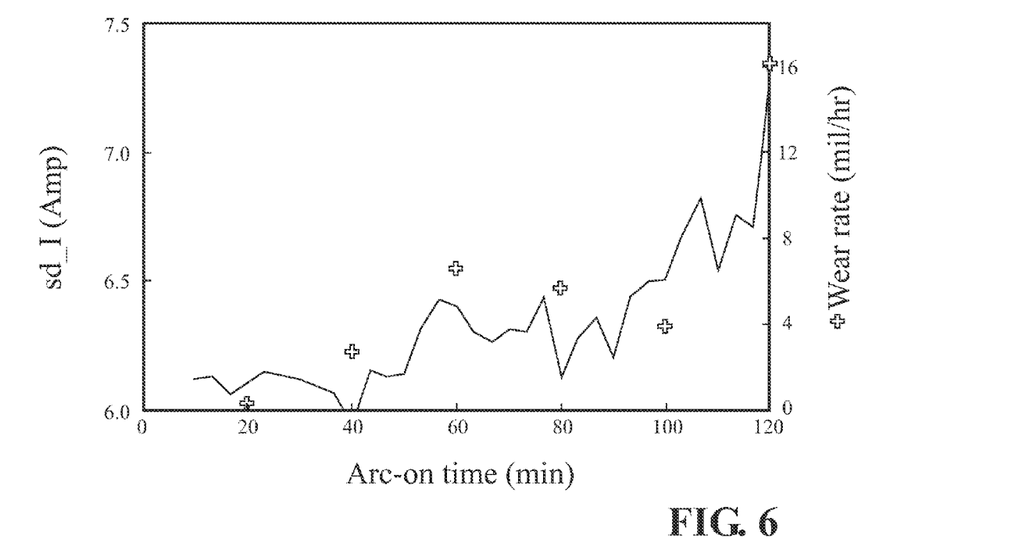
FIG. 6 is a graph of standard deviation of measured welding current and contact tip wear rate with respect to arc-on time.
Figure 7:
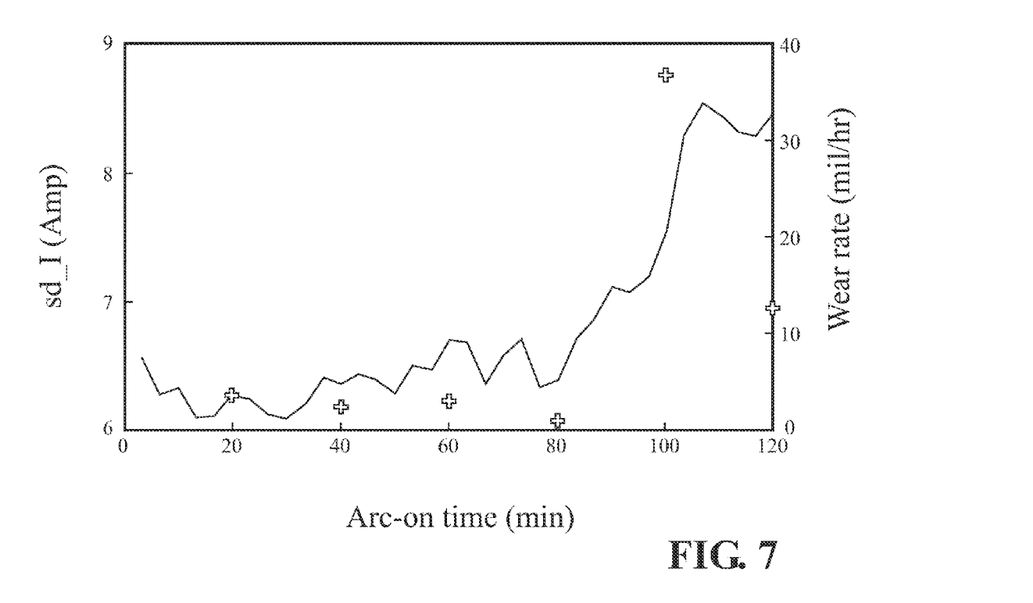
FIG. 7 is another graph of standard deviation of measured welding current and contact tip wear rate with respect to arc-on time.

In two separate test runs under the same conditions, the wear rates of contact tips (i.e., the linear rates of keyhole formation in the contact tip) were measured as a function of arc-on time, the results of which are graphically depicted in FIGS. 6 and 7. As can be seen from the graphs, there is a clear correlation between welding current fluctuation (i.e., the standard deviation of the welding current) and the contact tip wear rate, specifically the contact tip wear rate increases as the welding current fluctuation increases. Thus, the standard deviation of the welding current can be used to predict the wear rate and the wear amount (size of the keyhole) of the contact tip in real time. It should be understood that the "standard deviation" of the welding current as used above can be substituted for other numeric deviations, as long as they represent the variation or fluctuation of the welding current or voltage.

A second example of an application of the presently claimed was performed in a typical industrial mass welding production cell using high speed pulse welding. The arrangement of the welding cell was similar to the welding cell 10 shown schematically in FIG. 1. During the test, the robot made seven welds on each parts, and the length of the welds were 16.8, 2.0, 0.3, 16.5, 2.0, 16.5, and 2.0 seconds. The first of these welds was selected as the representative weld. The welding power source averaged the welding data to 5 Hz output, thus 84 data points were obtained for the representative weld. The data for the arc start and arc stop were also removed, leaving 76 data points.

The following Table 3 includes the starting parameters and constant factors obtained and used for calculating the ITL and ITL_v.

TABLE 3

| Parameter | Value |
|---|---|
| $I_0$ | 268 Amp |
| $sd\_I_0$ | 6.0 Amp |
| $V_0$ | 21.0 Volts |
| a | 0.89 |
| b | 1.5 |
| c | 0.10 |

Figure 8:
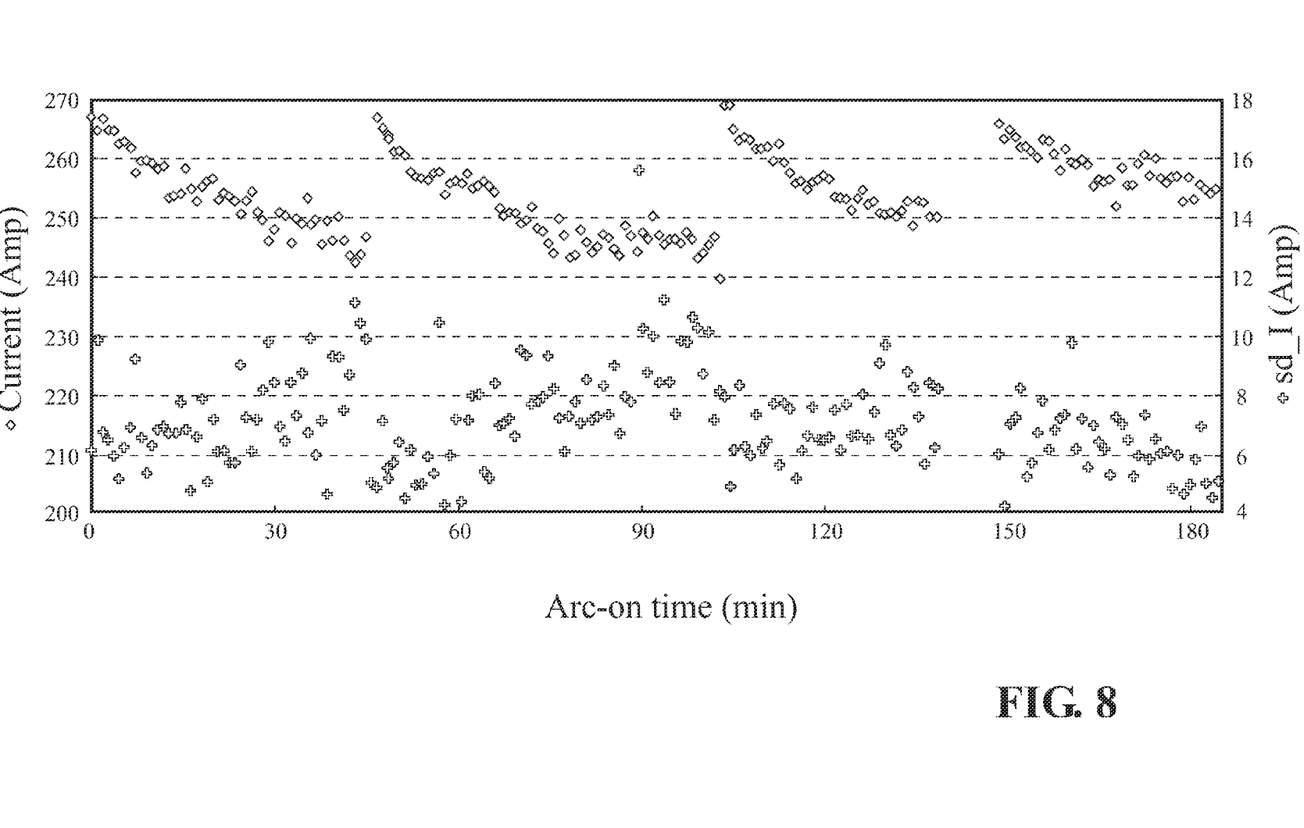
FIG. 8 is a graph of measured welding current and standard deviation of the measured welding current with respect to arc-on time.
Figure 9:
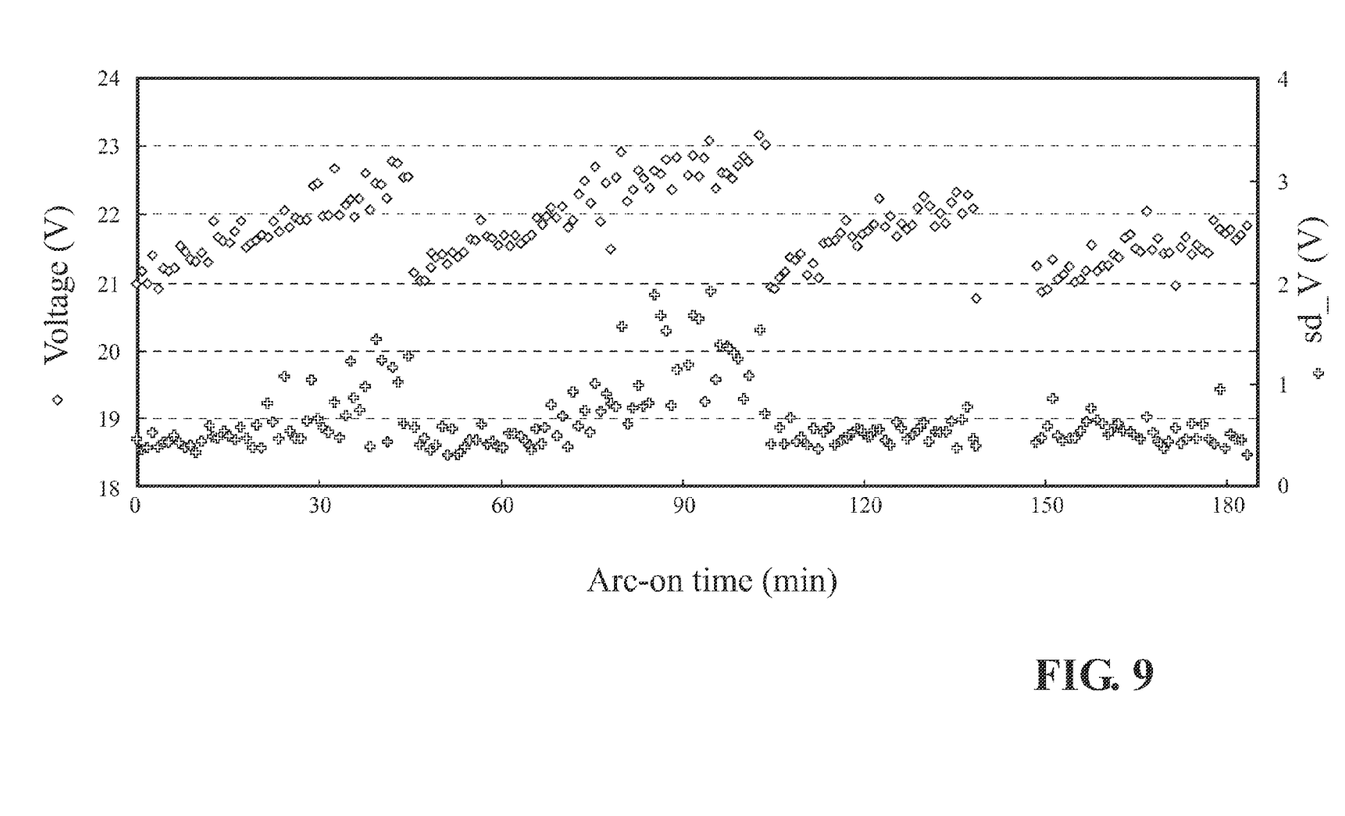
FIG. 9 is a graph of measured welding voltage and standard deviation of the measured welding voltage with respect to arc-on time.

FIGS. 8 and 9 are graphs of the measured and calculated welding current I, standard deviation of the welding current sd_I, welding voltage V, and standard deviation of the welding voltage sd_V as a function of arc-on time. In these figures, at about an arc-on time of 50 minutes, the contact tip in the welding torch was replaced with a new contact tip. Hence, the parameters returned to values similar to the starting values at arc-on time equal to 0. The contact tip was changed again at about 110 minutes. At about 140 minutes, the manufacturing shift ended, and the contact tip was replaced prior to the beginning of the next shift, which began at approximately 150 minutes.

Figure 10:
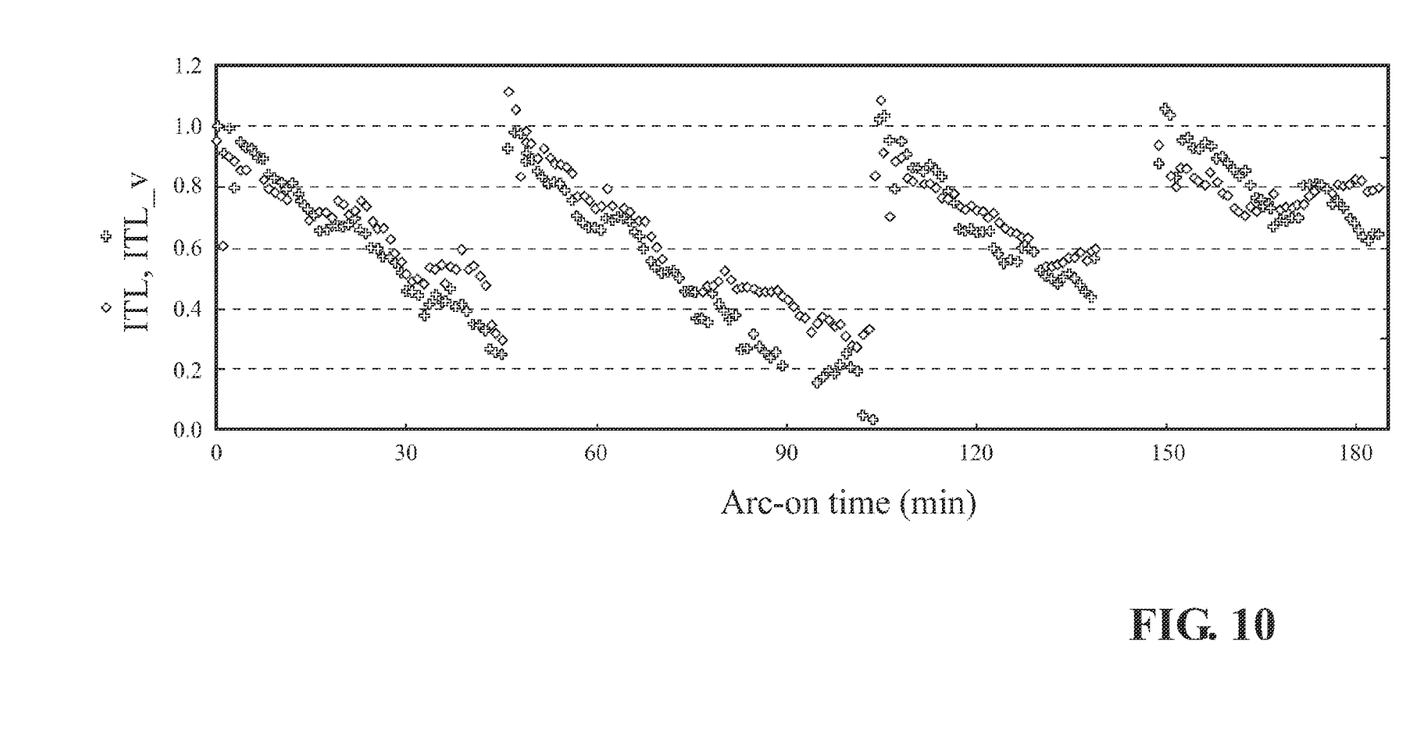
FIG. 10 is a graph of a calculated index of contact tip life ITL and a calculated reference index of contact tip life ITL_v with respect to arc-on time calculated using the data in FIGS. 8 and 9.

FIG. 10 is a graph of the calculated ITL and ITL_v values as a function of arc-on time. The ITL and ITL_v values at an arc-on time of about 50 minutes and 110 minutes (when the contact tips were changed) indicate that these first two contact tips were almost fully deteriorated. The ITL and ITL_v values between 110 minutes and 150 minutes (i.e., for the third contact tip) indicate that the contact tip was not fully deteriorated when it was changed at the end of the shift (at 150 minutes). The fourth contact tip between 150 and 180 minutes was also not fully deteriorated at the arc-on time of 180 minutes. As in the previous example, the ITL and ITL_v both exhibit a similar decreasing trend (for each contact tip) as arc-on time increases.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A method of monitoring contact tip useful life in a welding torch, said method comprising the steps of:
measuring at least one of welding current (I) and welding voltage (V) of the contact tip mounted in the welding torch; and
quantifying deterioration of the contact tip based on a decrease of the welding current and increase of a standard deviation of the welding current (sd_I).

2. The method of claim 1, including the step of:
averaging the welding current and welding voltage measured over a period of time to obtain a single welding current value and a single welding voltage value for the period of time.

3. The method of claim 2, wherein the period of time corresponds to one weld.

4. The method of claim 1, wherein the measurements are taken while performing a chosen representative weld on a workpiece.

5. The method of claim 1, including the step of:
removing noise and known error from the measured welding current and welding voltage during at least one of an arc start and an arc stop (crater).

6. The method of claim 1, further including the steps of:
obtaining starting parameters including an initial welding current ($I_0$) and a standard deviation of the welding current ($sd\_I_0$) over an initial period of time;
quantifying deterioration of the contact tip by calculating an index of contact tip life (ITL) from the following Equation 1 which is a function of the welding current and the standard deviation of the welding current:

$$ITL = \left| \frac{I - a \cdot I_0}{2 \cdot (1-a) \cdot I_0} \right| + \left| b - \frac{sd\_I}{sd\_I_0} \right| \quad \text{(Eq. 1)}$$

wherein a is a constant factor of current decay and b is a constant factor of the sd_I increase; and sending the calculated ITL to one of a human operator and an automated controller.

7. The method of claim 1, wherein an index of contact tip life (ITL) is calculated as a function of at least one of the welding current (I) and the standard deviation of the welding current (sd_I), and the ITL decreases from full scale towards 0 as the welding current decreases and/or the standard deviation of the welding current increases in certain ranges.

8. The method of claim 6, wherein an ITL value less than or equal to a threshold value indicates that the contact tip is reaching the end of its useful life.

9. The method of claim 8, wherein the threshold value is between 0 and 0.30.

10. The method of claim 8, including the step of:

when the ITL reaches the threshold value, performing one or more of: sounding an alarm, displaying a warning message, scheduling a contact tip change, and triggering an automatic contact tip change.

11. The method of claim 6, including the step of:

adjusting at least one of the constant factors a and b if welding quality is acceptable when the ITL reaches a threshold value or if welding quality is unacceptable before the ITL reaches the threshold value.

12. The method of claim 6, wherein an average of a plurality of calculated ITL values are sent to the human operator or the automated controller.

* * * * *